(12) United States Patent
Miller

(10) Patent No.: US 6,651,824 B2
(45) Date of Patent: Nov. 25, 2003

(54) FILTER PITCHER WITH ICE HOPPER

(75) Inventor: D. Scott Miller, Orlando, FL (US)

(73) Assignee: Dart Industries Inc., Orlando, FL (US)

( * ) Notice: Subject to any disclaimer, the term of this patent is extended or adjusted under 35 U.S.C. 154(b) by 9 days.

(21) Appl. No.: 09/932,811

(22) Filed: Aug. 17, 2001

(65) Prior Publication Data

US 2003/0034291 A1 Feb. 20, 2003

(51) Int. Cl.[7] .................................... B01D 35/027
(52) U.S. Cl. ................. 210/464; 210/473; 210/474
(58) Field of Search .................. 210/282, 287, 210/467–469, 473–474, 477, 455, 244–246, 464, 466

(56) References Cited

U.S. PATENT DOCUMENTS

| | | | |
|---|---|---|---|
| 444,013 A | * | 1/1891 | Paddock |
| 4,298,475 A | * | 11/1981 | Gartner ........................ 210/266 |
| 4,623,457 A | | 11/1986 | Hankammer |
| 4,969,996 A | | 11/1990 | Hankammer |
| 5,049,272 A | * | 9/1991 | Nieweg ........................ 210/266 |
| 5,190,643 A | | 3/1993 | Duncan et al. |
| 5,637,214 A | * | 6/1997 | Kahana ........................ 210/282 |
| 5,964,909 A | | 10/1999 | Brunner ........................ 55/377 |
| 6,103,114 A | | 8/2000 | Tanner et al. ................ 210/232 |

* cited by examiner

Primary Examiner—Joseph Drodge
(74) Attorney, Agent, or Firm—Taylor J. Ross

(57) ABSTRACT

The pitcher body takes a standard form to hold a beverage for storage. Mounted within the pitcher body is a filter assembly including a reservoir section, an outlet, and a filter element located operatively prior to the outlet. Additionally, a water-tight sealing cap is provided to seal the outlet. With the sealing cap removed, the filter assembly operates as normal, filtering water from the reservoir section to the pitcher body. With the sealing cap blocking the outlet, the reservoir section may be used as an ice hopper to cool the filtered water without contamination. The filter element may also be removed if the sealing cap blocks the outlet to provide increased capacity for holding ice.

2 Claims, 1 Drawing Sheet

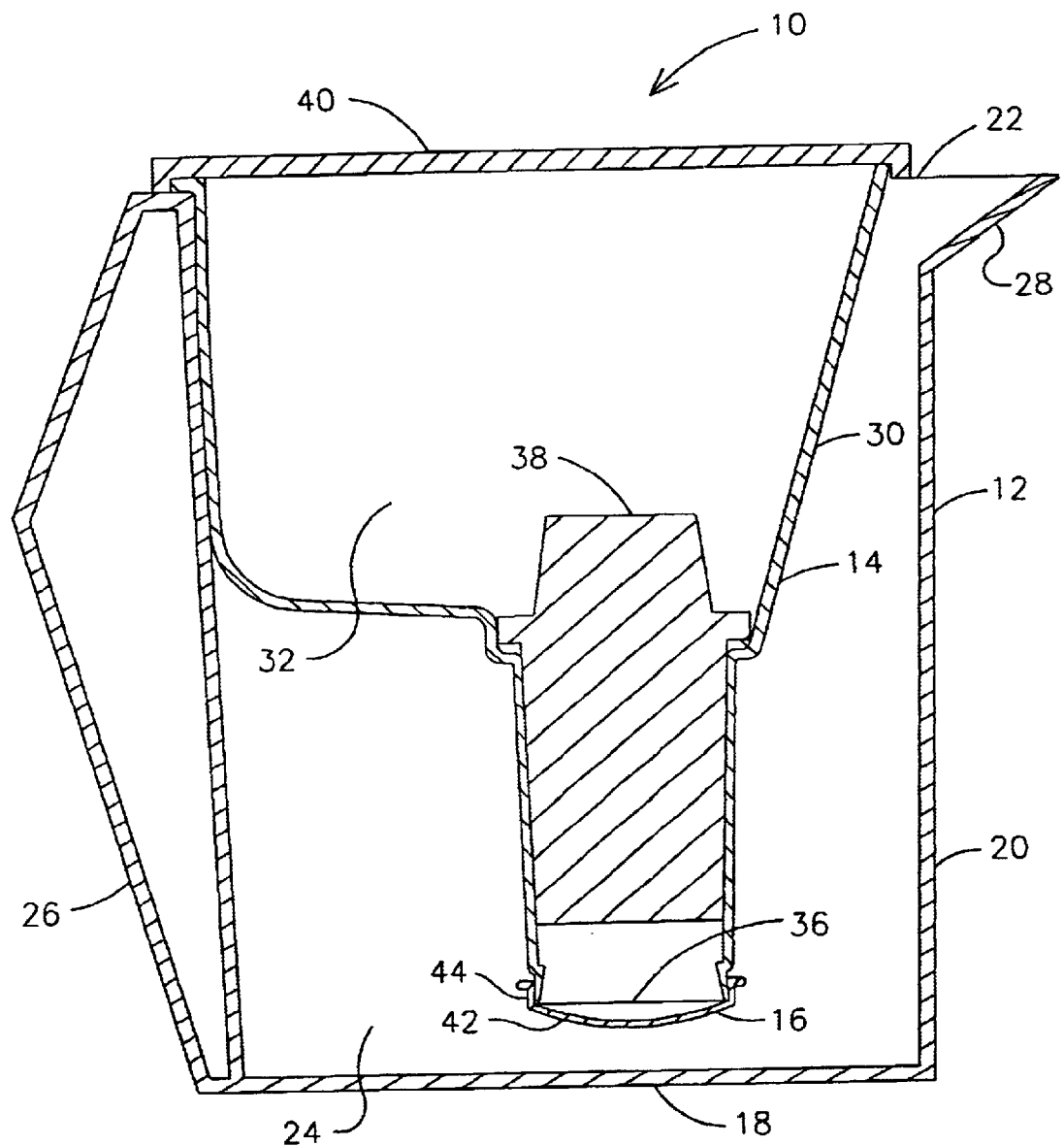

FILTER PITCHER WITH ICE HOPPER

CROSS-REFERENCE TO RELATED APPLICATIONS

Not applicable.

STATEMENT REGARDING FEDERALLY SPONSORED RESEARCH

Not Applicable.

BACKGROUND OF THE INVENTION

The present invention relates in general to beverage pitchers, and in particular to a beverage pitcher having a water filtration reservoir which may be sealed for use as an ice hopper to cool the filtered water.

Numerous arrangements are known for providing a beverage pitcher with a water filter. These typically include providing a relatively standard pitcher with an internal reservoir. This reservoir includes an outlet at its lower end, and a filter element is located operatively prior to the outlet. As such the user may introduce water into the reservoir, and by gravity the water will flow through the filter element, exit the outlet, and fill the pitcher. The user may then remove the reservoir and filter element from the pitcher, but often it is simply retained in the pitcher for convenience.

Within the beverage pitcher art it is also known to provide a pitcher with a sealed ice hopper extending into the body of the for contact with the beverage. When filled with ice, this will cool the beverage without mixing the beverage with the water from the melting ice.

SUMMARY OF THE INVENTION

It is an object of the present invention to provide a beverage pitcher which allows filtering of water.

It is a further object of the present invention to provide a beverage pitcher which permits cooling of the beverage without dilution or contamination.

These and other objects are achieved by a filter pitcher with ice hopper. The pitcher body takes a standard form to hold a beverage for storage. Mounted within the pitcher body is a filter assembly including a reservoir section, an outlet, and a filter element located operatively prior to the outlet. Additionally, a water-tight sealing cap is provided to seal the outlet. With the sealing cap removed, the filter assembly operates as normal, filtering water from the reservoir section to the pitcher body. With the sealing cap blocking the outlet, the reservoir section may be used as an ice hopper to cool the filtered water without contamination. The filter element may also be removed if the sealing cap blocks the outlet to provide increased capacity for holding ice.

BRIEF DESCRIPTION OF THE DRAWINGS

The objects and features of the invention noted above are explained in more detail with reference to the drawings, in which like reference numerals denote like elements, and in which:

The FIGURE is a cross-sectional view of a filter pitcher with ice hopper according to the present invention.

DETAILED DESCRIPTION OF THE INVENTION

With reference to the FIGURE, a filter pitcher with ice hopper according to the present invention is generally designated by reference numeral 10. The filter pitcher with ice hopper 10 generally includes a pitcher body 12, a filter assembly 14 and a sealing cap 16. Each of these items will be described in more detail.

The pitcher body 12 may take a variety of forms as known in the art. Typically, however, the pitcher body 12 will include a base 18 having a periphery, and one or more side walls 20 extending upward from the periphery of base 18 to a pitcher rim 22. This will define a pitcher interior 24 which may receive a liquid beverage (not shown), and various other components as described. A handle 26 may secured to the side wall 20 for manual lifting of the pitcher body 12. Opposite the handle 26, a pour spout 28 may be formed to assist in dispensing the beverage from the pitcher body 12.

The filter assembly 14 is mounted to the pitcher body 12. While this may be a permanent mounting, it is preferred that the filter assembly be removable from the pitcher body for ease of cleaning. The filter assembly includes a reservoir section 30 defining a reservoir interior 32 intended to receive water to be filtered. The reservoir section may be secured to the pitcher body 12 in a variety of ways known in the art. In the embodiment shown, a reservoir flange 34 rests upon a portion of the pitcher rim 22. Other arrangements are of course possible.

Associated with the reservoir section 30 is an outlet 36. The outlet 36 is typically at the lowest portion of the reservoir section 30 such that water may naturally drain from the reservoir section 30 via the outlet 36. A filter element 38 is mounted within the filter assembly 14 operatively prior to the outlet 36. In the embodiment shown, the reservoir section 30 is elongated to receive the filter element 38, essentially forming a conduit through which the filtering water must pass. Other arrangements known in the art may of course also be employed.

The structure and arrangement described to this point is commonly known in the prior art. As such, the various incedental features known in the art may also be used with the filter pitcher 10 of the present invention. For example, a cover 40 may be removably mounted to the pitcher rim 22.

The inventive feature of the present filter pitcher 10 is the addition of the sealing cap 16. In particular, the sealing cap 16 may be removably mounted to the filter assembly 14 to block the outlet 36 in a preferably watertight manner. In the embodiment shown, the sealing cap 16 takes the form of a central body 42 surrounded by a skirt 44, preferably formed of a monolithic piece of a relatively resilient plastic, such as polypropylene. The skirt 44 is sized to be frictionally retained upon the filter assembly 14 in covering relation to the outlet 36. Such a frictional fit may be designed to be water-tight, yet relatively simple to mount and remove the sealing cap 16. Various other arrangements (not shown) are also possible, such as providing the sealing cap 16 with a gasket, attaching the sealing cap via screw threads, and the like.

In operation, the inventive feature permits the filter assembly 14 to be converted into an ice hopper. Specifically, with the sealing cap 16 in place the reservoir interior 32 may be filled with ice (not shown) or other reduced temperature material. As may be envisioned, the beverage within the pitcher body 12 will thus be cooled. For increased ice capacity, the filter element 38 may be removed. The preferred water-tight nature of the sealing cap 16 will prevent any water from the melting ice to mix with the beverage stored in the pitcher body 12. This will prevent dilution of flavored beverages, or contamination of filtered water. When the user wishes to filter more water, the sealing cap 16 may simply be removed.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A filter pitcher with ice hopper, comprising a pitcher body defining a pitcher interior, a pour spout, a removable cover, a filter assembly at least partially received within said pitcher interior, said filter assembly including a reservoir section, an outlet, and a filter mounted operatively prior to said outlet, the improvement comprising:

a sealing cap secured to said filter assembly and blocking said outlet, whereby said reservoir section may be filled with ice to cool a beverage within said pitcher body.

2. A filter pitcher as in claim 1, wherein said sealing cap is secured to said filter assembly in a water-tight manner.

* * * * *